(12) United States Patent
Porter

(10) Patent No.: US 8,812,512 B2
(45) Date of Patent: Aug. 19, 2014

(54) BITEMPORAL RELATIONAL DATABASES AND METHODS OF MANUFACTURING AND USE

(76) Inventor: Luke Martin Leonard Porter, Birmingham (GB)

(*) Notice: Subject to any disclaimer, the term of this patent is extended or adjusted under 35 U.S.C. 154(b) by 90 days.

(21) Appl. No.: 13/614,609

(22) Filed: Sep. 13, 2012

(65) Prior Publication Data

US 2013/0073593 A1 Mar. 21, 2013

Related U.S. Application Data

(63) Continuation-in-part of application No. 13/034,366, filed on Feb. 24, 2011, now abandoned, which is a continuation of application No. 12/571,921, filed on Oct. 1, 2009, now abandoned, which is a continuation of application No. 11/931,641, filed on Oct. 31, 2007, now abandoned, which is a continuation of application No. 10/665,818, filed on Sep. 19, 2003, now Pat. No. 7,346,628.

(30) Foreign Application Priority Data

Jan. 15, 2003 (GB) .................................... 0300813.3

(51) Int. Cl.
*G06F 17/30* (2006.01)

(52) U.S. Cl.
USPC .......................................................... 707/746

(58) Field of Classification Search
USPC ........ 707/1, 2, 8, 9, 104.1, 200, 746; 709/224
See application file for complete search history.

(56) References Cited

U.S. PATENT DOCUMENTS

| 5,924,103 | A  | * | 7/1999  | Ahmed et al. ........................ 1/1 |
| 6,510,420 | B1 | * | 1/2003  | Cessna et al. ................... 706/45 |
| 6,944,604 | B1 | * | 9/2005  | Majoor ........................... 706/45 |
| 2003/0187862 | A1 | * | 10/2003 | Brobst ........................... 707/102 |

* cited by examiner

*Primary Examiner* — Etienne Leroux
(74) *Attorney, Agent, or Firm* — Proskauer Rose LLP

(57) ABSTRACT

A method of reducing the time taken to manufacture a bitemporal relational database is disclosed. The method involves designing business database tables with relational rules stored in a relational kernel or referential rule dictionary, and designing those tables so as to be without start date and end date columns for start of valid time and end of valid time for entities, and designing the system to be without history tables recording the history of relationships between entities in the database; the system being designed as a current view with primary key and unique key constraints, and time-related issues being taken care of by the S$, T$, and E$ tables automatically generated as the data structure of the system is populated with data.

4 Claims, 25 Drawing Sheets

| Key | Meaning |
|---|---|
| # | Indicates a Primary Key Column |
| * | Indicates a Mandatory Column |
| PKCOL | Primary Key |
| UKCOL | Unique Key |
| FKCOL | Foreign Key |
| COL1, COL2, COL3 | Non Key |
| FROM VALID | From Valid Timestamp |
| TO VALID | To Valid Timestamp |
| FROM TRANS | From Transaction Timestamp |
| TO TRANS | To Transaction Timestamp |

120

```
TABLE
#*PKCOL
 * UKCOL
 * FKCOL
   COL1
   COL2
   COL3
 *
 FROM_VALID
   TO_VALID
 *
 FROM_TRANS
   TO_TRANS
```

110

| Key | Meaning |
|---|---|
| # | Indicates a Primary Key Column |
| * | Indicates a Mandatory Column |
| PKCOL | Primary Key |
| UKCOL | Unique Key |
| FKCOL | Foreign Key |
| COL1, COL2, COL3 | Non Key |
| FROM VALID | From Valid Timestamp |
| TO VALID | To Valid Timestamp |
| FROM TRANS | From Transaction Timestamp |
| TO TRANS | To Transaction Timestamp |

Report Date: Mon Aug 01 2005 17:46:15

INVESTMENT BANK - (1401 US) - FX Revaluation

ClsOfBus Dt 29-JUL-05  CustomerName  CLIENT PORTFOLIO COMPANY LP, NEW YORK  Ccy Pair  AUD/USD

| Deal# | Trade Dt | Value Dt | Cur | YouBought (Sold) | Traded Rate | Cur | YouBought (Sold) | P/L Inception TD | Reval Spot Rate | Reval Fwd Rt (USD/ccy) |
|---|---|---|---|---|---|---|---|---|---|---|
| 9241694 | 6-JUN-05 | 9-SEP-05 | AUD | -1,801,000.00 | 0.75900000 | USD | 1,366,959.00 | 5,486.04 | 0.75750000 | 0.75595389 |
| 9462807 | 21-JUN-05 | 9-SEP-05 | AUD | 241,000.00 | 0.77785000 | USD | -187,461.85 | -5,276.95 | 0.75750000 | 0.75595389 |
| 9765344 | 14-JUL-05 | 9-SEP-05 | AUD | -391,000.00 | 0.74700000 | USD | 292,077.00 | -3,500.97 | 0.75750000 | 0.75595389 |
| Totals: AUD/USD | | | | -1,951,000.00 | | | 1,471,574.15 | -3,291.88 | | |
| Deal(s): 3 | | | | | | | | | | |

ClsOfBus Dt 29-JUL-05  CustomerName  CLIENT PORTFOLIO COMPANY LP, NEW YORK  Ccy Pair  EUR/USD

| Deal# | Trade Dt | Value Dt | Cur | YouBought (Sold) | Traded Rate | Cur | YouBought (Sold) | P/L Inception TD | Reval Spot Rate | Reval Fwd Rt (USD/ccy) |
|---|---|---|---|---|---|---|---|---|---|---|
| 9241797 | 6-JUN-05 | 9-SEP-05 | EUR | 1,435,000.00 | 1.23185000 | USD | -1,767,704.75 | -24,866.32 | 1.21270000 | 1.21452155 |
| 9384690 | 15-JUN-05 | 9-SEP-05 | EUR | 613,000.00 | 1.21453000 | USD | -744,506.89 | -5.17 | 1.21270000 | 1.21452155 |
| 9404539 | 16-JUN-05 | 9-SEP-05 | EUR | 377,000.00 | 1.21165000 | USD | -456,792.05 | 1,082.57 | 1.21270000 | 1.21452155 |
| 9424257 | 17-JUN-05 | 9-SEP-05 | EUR | 356,000.00 | 1.22743000 | USD | -436,965.08 | -4,595.40 | 1.21270000 | 1.21452155 |
| 9443110 | 20-JUN-05 | 9-SEP-05 | EUR | 176,000.00 | 1.21745000 | USD | -214,271.20 | -515.41 | 1.21270000 | 1.21452155 |
| Totals: EUR/USD | | | | 2,957,000.00 | | | -3,620,239.97 | -28,899.73 | | |
| Deal(s): 5 | | | | | | | | | | |

Figure 6

| Object | Number of Rows | |
|---|---|---|
| Base Data | | |
| Securities | 100 | |
| Clients | 1000 | |
| Positions | 100,000 | |
| Trades | 22,400,000 | |
| OLTP Operations | | Elapsed Time (secs) |
| Insert new trade | 1 trade | 0.03 |
| Delete trade | 1 trade | 0.01 |
| Correct trade by moving to new position | 1 trade | 0.04 |
| Correct trade by changing exchange rate | 1 trade | 0.02 |
| | | |
| Insert new position | 1 position | 0.02 |
| Delete position | 1 position | 0.01 |
| Reporting (no indexes) | | Elapsed Time (secs) |
| Select trade with known id | 1 trade | 0.04 |
| Select valid time trade history with known id | 1 trade | 0.04 |
| Select trans time trade history (1 row returned) | 1 insert | 0.03 |
| Select trans time trade history (8 rows returned) | 1 insert<br>1 position change<br>6 exchange rate changes | 0.07 |
| Reporting (with index on Position ID) | | Elapsed Time (secs) |
| End of Day Client Position Report | 2 trades | 0.03 |
| End of Day Client Position Report | 225 trades | 0.03 |

Figure 7

SQL script for producing Report using TRE methodology

```
set echo off
prompt *************************************************************
prompt * Set the TIME to 6th June 2005 9.30 am
prompt *
prompt *************************************************************
set echo on exec dbms_systime.set_valid_time(:vttrade1);   * This sets the database at the point in time for the required data prompt ***********************************************************************************
prompt * 1. This is the client report at a valid time 6th June 2005 9.30 am
prompt * Transaction time defaults to NOW ie Current View (can be set to whenever)
prompt * Point in time view holding all data in relationally correct state
prompt * The same SQL is used/executed to provide the report output for any point in time
prompt ************************************************************************************* select to_char(T.SOV,'DD-MON-YYYY') "Trade Dt"       ,
       to_char(T.EOE,'DD-MON-YYYY') "Value Date"     ,
       T.QTY                         "YouBought(Sold)"   ,
       EXCHANGE_RATE                 "Traded Rate"    ,
       T.QTY*T.EXCHANGE_RATE*-1      "YouBought(Sold)"  ,
       (S.MMEOD_PRICE*T.QTY)+(T.QTY*T.EXCHANGE_RATE*-1) "P/L Inception TD" ,
       S.MMEOD_PRICE                 "Reval Fwd Rt"
from TRADES_Z  T,
     SECURITIES S,
     POSITIONS  P
where T.PSN_ID = P.ID
  and P.SCT_CODE = S.CODE
order by T.EOE, T.SOV
```

Figure 8

Timestamp Approach

Step 1 – 1NF through 5NF

| Table |
|---|
| #* PKCOL |
| * UKCOL |
| * FKCOL |
| * COL1 |
| * COL2 |
| o COL3 |

Figure 9

Timestamp Approach

Step 2 – Append FROM and TO columns for Valid Time

| Table |
|---|
| #* PKCOL |
| * COL1 |
| * COL2 |
| o COL3 |
| * FROM_VALID |
| o TO_VALID |

Figure 10

Timestamp Approach

Step 3 – Append FROM and TO columns for Transaction time

| Table |
|---|
| #* PKCOL |
| * COL1 |
| * COL2 |
| o COL3 |
| * FROM_VALID |
| o TO_VALID |
| * FROM_TRANS |
| o TO_TRANS |

Figure 11

Timestamp Approach

Step 4 – Store and Index the FROM and TO columns in various ways

Table
* PKCOL
* COL1
* COL2
o COL3
* FROM_VALID
o TO_VALID

Figure 12

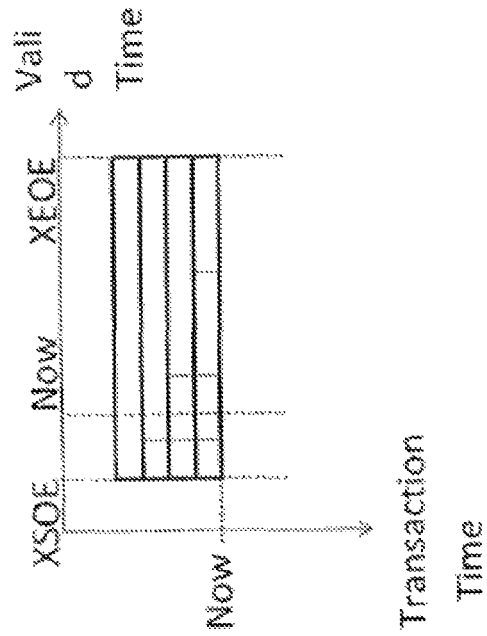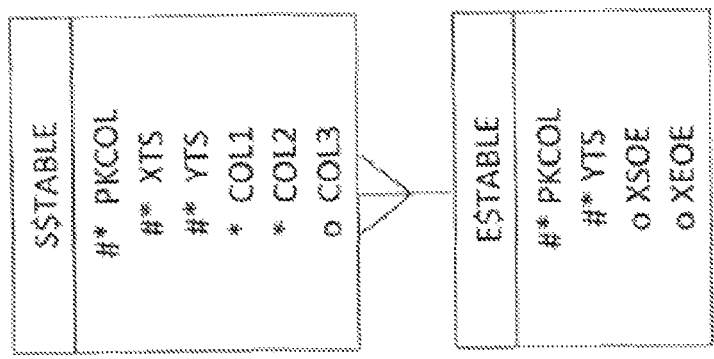
Figure 18

BITEMPORAL RELATIONAL DATABASES AND METHODS OF MANUFACTURING AND USE

REFERENCE TO RELATED APPLICATIONS

This application is a continuation-in-part of U.S. patent application Ser. No. 13/034,366, filed on Feb. 24, 2011, which is itself a continuation of U.S. patent application Ser. No. 12/571,921, now abandoned, that was filed on Oct. 1, 2009, which itself is a continuation of U.S. patent application Ser. No. 11/931,641, now abandoned, which is a continuation of U.S. patent application Ser. No. 10/665,818, filed on Sep. 19, 2003, which is now patented as U.S. Pat. No. 7,346,628, all of which entireties are incorporated herein by reference.

TECHNICAL FIELD

The present invention generally relates to bi-temporal relational databases, how to make them, and how to use them.

BACKGROUND

Data entities in databases often have a time element linked to them. Bi-temporal databases are known (ones with valid time and transaction time). When a relational database for example an Oracle™ database is designed, great care is taken in the writing of the software that controls the data and sets up the data structure to allow for all queries that will be made. A kernel is created to control allowable changes to data entries, within relationship rules linking the data entries. The relationship rules all need to be specified in advance. To allow for the correction of errors that are introduced when entering data into the database (either because the data enterer made some human error, or because they themselves were working on incorrect information), databases often have roll-back software and memories that are used to recreate the "then" content of the databases so that queries of the database can return answers to queries that are the same as that which the query would have returned at a specified date in the past (the current view data having been corrected to correct the error). Such roll-back infrastructure is memory and processor intensive, and expensive and awkward to write.

Furthermore, writing the software code for a relational database has previously been a bespoke task requiring skilled people, and a task that needs doing again should there be a new query that the manager (person) of the database wants to run. It can be a real problem if one thinks of a new query to run on an existing relational database. SQL may not produce good results if the relational integrity between data entities cannot cope with the new query as it is run at different times in the computer system.

SUMMARY

A brief summary of various exemplary embodiments is presented. Some specifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in the later sections.

According a various aspects, the invention provides a temporal relational database and associated data structure and database management software system. The system comprises a computer memory and a computer processor adapted to process data held in the memory, business data and associated time data held in computer memory, and database management software held in computer memory and runable on the processor to interact with the business data. The data structure haves the business data and associated time data held in three tables, a first S$ table, a second T$ table and a third E$ table. The S$ table (summary table) contains all versions of the all rows of business data, the rows having at least dimensions of transaction time, valid time, and business primary key. The E$ table (event table) holds the valid start of existence and valid end of existence of all rows in the S$ table, avoiding storing end dates of rows in the S$ table, and the rows of the E$ table being dimensional by at least transaction time and business primary key. The T$ table holds the primary key and unique keys of all rows in the $ table dimensioned by business primary key. The database management software, when run on the processor, allows the entry of new rows in the S$ table with the transaction time being set by the system clock and the valid time and business data being manually entered or read/generated by the processor, entries in the S$, E$ and T$ tables being automatically generated by the database management software. The database management software, when run on the processor, also allows a user to query the database to select a current view report with valid time now, or a report where both valid time and transaction time are specified by the user, the report showing the values of entities in the S$ table specified by the selected valid and transaction time dimensions. The database management software, when run on the processor, allows a report of entities showing start and end times for entities to be generated, with the actual start and end of existence times being held in the T$ table. The database management software, when run on the processor, also allows a valid time history view of values of entities to be obtained, and a transaction time history view of values of entities can be obtained. The referential rules managing values of entities are stored in a referential rule dictionary and control relational aspects of values of the entities.

In other aspects, the management software may also enable pseudo tables to be generated and displayed or communicated to a user, the pseudo tables having values for foreign keys of primary key-identified entities, and having generated by the management software one, two, three, four or five of: (i) a transition time (YTS) column indicating the time that a row in the S$ table was committed to the database, (ii) a start of existence (SOE) time that is the valid time of an insert event into the S$ table, (iii) and an end of existence (FOE) time (if one exists for the value) that is the valid time of a delete event for the property of the entity in a row of the S$ table, (iv) a start of valid (SOV) column that is the valid time that a version of the row in the S$ table acquired its values, and (v) end of valid (EOV) column that is the valid time that the next version of that row in the S$ table acquired its values. The EOV is not stored in the same row of the $ table as the primary key to which it relates, but is derived from the SOV of the next (in transaction time) row version from that primary key.

According to another aspect, the invention provides a method of reducing the time taken to manufacture a bitemporal relational database. The method includes manufacturing a temporal relational database and associated data structure and database management software system according to the preceding aspect of the invention. The method also includes designing business database tables with relational rules stored in a relational kernel or referential rule dictionary and designing those tables so as to be without start date and end date columns for start of valid time and end of valid time for entities. The method also includes designing the system to be without history tables recording the history of relationships between entities in the database. The system being designed as a current view with primary key and unique key constraints, and time-related issues being taken care of by the S$, T$, and E$ tables automatically generated as the data structure of the system is populated with data.

According to another aspect, the invention provides a method of receiving an answer to a query in a temporal relational database and associated data structure and database management system according to claim the first aspect of the invention. The method comprises specifying in a query the transaction time and valid time to be used, and the processor using the valid time and prosecution time to generate from the S$, T$ and E$ tables a response to the query, and displaying the query on a screen, printing it out, or transmitting it to a remote site.

The Temporal Relational Extension (TRE) invention is a method for storing data to comprehensively provide temporal support in a computer database. The TRE method stores data based on semantic rules implemented via a set of constraints. TRE comprises a logical data model, algorithms and temporal constraints used when populating a database.

BRIEF DESCRIPTION OF THE DRAWINGS

In order to better understand various exemplary embodiments, reference is made to accompanying drawings wherein:

FIG. 6 shows a typical client report used by banks for trade reconciliation;

FIG. 7 shows the results of performance testing an embodiment of the present invention;

FIG. 8 shows an example SQL script for producing a report using an embodiment of the present invention;

FIGS. 9 to 12 illustrates the old, known, timestamp approach used in the prior art to create or make a bi-temporal relational database;

FIGS. 13 to 19 illustrate my new TRE approach to time in a bi-temporal database and to make the database.

DETAILED DESCRIPTION

Figure 1:
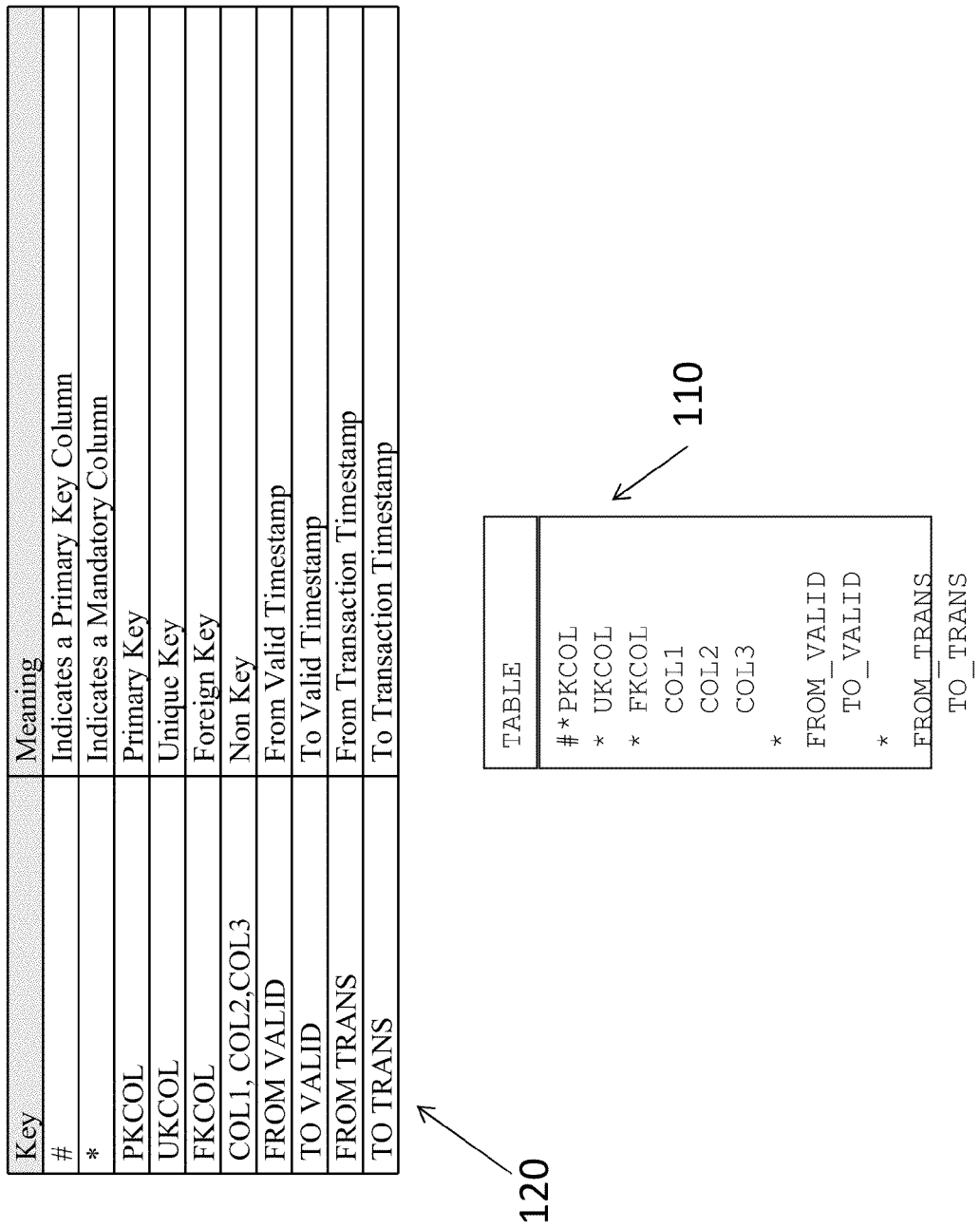
FIG. 1 shows a typical use of timestamp columns to add valid time and transaction time to rows in a database.

It is generally agreed that time dictates the interactions of our world and every action in the world has an associated time. In the database world there is a common acceptance of two principal dimensions of time, hence the term Bi-Temporal. The De-facto standard names for these dimensions are Transaction Time and Valid Time. Other names are Y-Time for Transaction time and X-Time for Valid time. All tables governed by the semantic rules of TRE are "bi-temporal".

TRE uses the mathematical technique of factoring. As time is ubiquitous and applies to all data (i.e., all data held in a database has at least the two time dimensions of transaction time and valid time), it can be factored away and dealt with separately. This has the added benefit of simplifying the design and implementation of the database data model for any business or user requirement.

Separating Time from Data (Factoring)

Once time is separated from the business data it can be efficiently managed and stored by the infrastructure and presented back to the computer application as pseudo columns. When time is managed in this way the application developer only needs to consider the business data. Additional history/audit tables are not required since all versions of rows (both past and future) are inherently provided by infrastructure. Data is accessed by setting the time context at statement level through SQL syntax.

It is understood that bi-temporal support is "all or nothing". The choice is to either model time, or to restrict to the "current view" taken by existing relational theory. Tables which have temporal support cannot be related to tables without. A similar design philosophy has also been adopted by Oracle Workspace Manager. Permitting bi-temporal, mono-temporal and non-temporal tables all in the same database schema is acceptable as long as there is no relational connection between tables.

TRE achieves the ideal by which a database analyst does not have to model any transaction time or valid time timestamps. These timestamps exist (in the same layout) on every entity but TRE delivers the capability where these timestamps are not changed directly and consequently do not appear as physical columns. They are therefore accessed as pseudo-columns (as with ROWNUM, LEVEL, SYSDATE et al.).

This is not to say that relations are not ever presented to the user or application with timestamps or periods, but that the underlying storage separates them and the only way to alter their values is through SQL instructions.

In this way it is left to the database to manage timestamps according to semantic rules held in the codebase and a set of constraints defined by the user via Primary Keys, Unique Keys and Referential Integrity constraints.

Durations, Gaps and Overlaps

Dealing with durations is essential when providing temporal support. The approach taken by TRE is a key differentiator when comparing it to other storage approaches.

In other approaches it is generally accepted that every row has additional start date and/or end date columns of data type 'date' or 'period'. These columns define or imply an effective duration for the row. Unfortunately, once timestamps are added in this way the possibility of overlaps and gaps between these durations occur.

One of the main principles of the TRE storage approach is that storing duration on a single row should be avoided since it creates the possibility of overlaps and gaps in the data. Overlaps and gaps do not make logical sense and so it follows that they should not be stored by the database. For example, a system that reports an employee as having both a salary of 20 k and a salary of 30 k at a specific valid time is clearly wrong. This breaks the principle that a database should provide a single version of the truth at a point in time. Similarly, a system that allows gaps in existence of a person makes no common sense since people do not exist, disappear and then reincarnate. Likewise, if an employee leaves an organization and then returns, it is a different period of employment, i.e., there are two separately-identifiable entity occurrences of employment.

The FIG. 1 shows a typical use of timestamp columns to add valid time and transaction time to rows in a database. Database table 110 uses notations as defined in 120.

When tables use time stamps as in FIG. 1, Data Manipulation Language (DML) operations and SELECTS become very complicated. If a FROM timestamp is stored on the same row then the possibility of gaps and overlaps needs to be catered for and 'date effective' joins are needed. "Developing Time-Oriented Applications in SQL", written by Richard T Snodgrass, gives a good description of the problems caused using this approach. On page 117 of this reference, he argues that a problem arises in assigning a primary key to a table which has "from valid time" timestamps and "to valid time" timestamps.

Users and applications still need to see start-dates and end-dates on a row. The answer is to provide them as pseudo columns, stored and maintained by the database, and provided by the user at statement level rather than being directly accessed as with a standard column database table.

The TRE approach separates time from the business data, manages, and stores it according to its rules and then presents it back to the application/user. The effort of dealing with time is taken by the infrastructure and not by the application layer. At a stroke TRE provides simplicity and improved functionality at the application layer.

Primary and Unique Key Constraints

Consider a table called TAB1 with columns A and B and a valid time duration VT:
TAB1 (A, B, VT) with rows:
A1 B1 [t1, t8]
A1 B2 [t8, t12]

On consideration it is not possible to use column A as the primary key with the presence of multiple rows with column A values of A1 and is therefore a problem. Additionally, any combination of A, B and VT is also not sufficient for use as a primary key. Alternative approaches to this problem propose something called a sequenced primary key to guard against any row holding the same primary key value at any given valid time.

This problem is addressed by a different and unique solution in TRE. TRE maintains the unique integrity of the primary key and importantly elevates/separates the role of the primary key from the role of the unique key. In non temporal storage modeling there is little differentiation between the use of primary keys and unique keys. In TRE the use and application of primary keys and unique keys are very specific.

Back to the Current View

In an "ordinary" relational table which has no timestamps, say TAB1(A,B), where column A is the PK, we could:
At [transaction time=t1], insert into TAB1 values (A1,B1)
At [transaction time=t5], delete from TAB1
At [transaction time=t8], insert into TAB1 values (A1,B1)

Over time, the value A1 is used twice. However, in a bi-temporal model we need to store both "lifetimes" of the A1, B1 row, and add the information about their periods of validity/existence. For TRE the primary key must also identify which lifetime of A1 we are talking about (the insert before the delete, or the insert after the delete).

In TRE the primary key is specifically used as a constraint that enforces that no two occurrences of an entity can hold the same value at any valid time and that each primary key value identifies an entity occurrence for its entire valid time life history (past and future) and cannot be reused, i.e., gaps and overlaps are not allowed.

Note that a valid time history or valid time period can be any period of time covering any part of the past, present or future.

In TRE the unique key is specifically used as a constraint that enforces that two entity occurrences cannot hold the same value at the same valid time, i.e., overlaps are not allowed, but there can be a period of valid times when no entity occurrence has that value and that value can be reused by any entity occurrence.

The event approach of TRE implicitly ensures that an entity occurrence cannot store two values of any attribute at the same valid time. Note also that an entity occurrence can hold the same value of an attribute at different valid times as long as that value it is not used in another entity occurrence at that valid time.

Recognizing this distinction is critical in providing temporal support. In an "ordinary" non temporal table the roles unique keys and the primary key are very similar, unique keys are candidate keys that for some reason were not chosen as the primary key. In the "ordinary" non-temporal table TAB1, we could choose to model column A as either a primary key (which cannot change over time), OR find a different primary (perhaps introduce a surrogate), and make column A a unique key.

Advantageously for TRE, Oracle already has constraint mechanisms for managing primary keys and unique keys which are perfectly adequate for the needs of TRE. This means that the existing SQL syntax for primary and unique keys does not need to be changed or enhanced.

Figure 2:
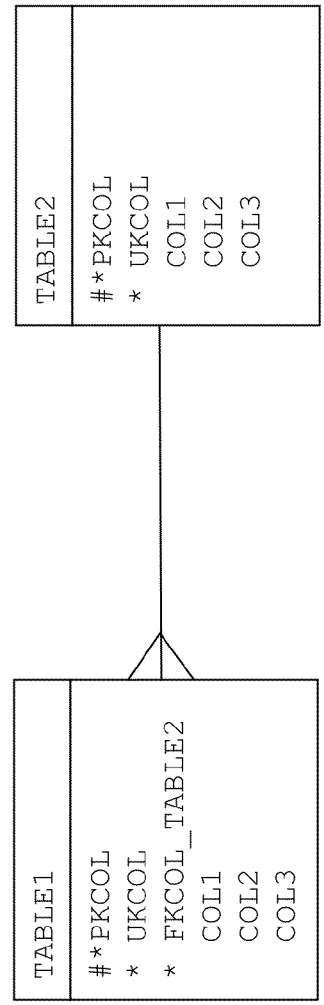
FIG. 2 shows a typical way of depicting an entity relationship between entities.

As mentioned earlier, because the timestamp columns are managed entirely by the database, it follows that they should not appear as physical columns. It is preferable that they are accessed as pseudo-columns (as with the system ROWNUM, LEVEL, SYSDATE). This means that when the database analyst is designing his model he does not include start dates and end dates in table designs. Additionally, because the database inherently knows the transaction and valid time history, there is no need to include History tables in the business data model. In fact, all that the data modeler needs to do is define the business data model as a current view with standard primary key and unique key constraints. In FIG. 2, 210 shows a normal way of depicting an entity relationship between two tables (Table1 and Table2) where the meaning of the notation is defined in 220.

Foreign Key Constraints (Referential Integrity)

The role of the foreign key is unchanged and is used to relate rows in one table with a row in a separate table e.g. employees with a department. It follows that TRE can interpret any foreign constraints defined by the data modeler and use them accordingly.

However, according to the semantics of TRE there are additional requirements, over and above the simple existence of a related row. When dealing with valid time it is a requirement to ensure that the start of existence and end of existence of related rows are also constrained appropriately. For example, we cannot allow an employee to be placed in a department when that department does not exist at that valid time. To ensure that related rows have this kind of temporal referential integrity the database needs an additional set of referential constraint rules.

The elevated role of the primary key is critical when dealing with referential integrity. In a non-temporal world, the foreign can be joined to any unique column (primary key or unique key) in the related entity. In TRE, the foreign key must be joined to a primary key since that is what identities an entity occurrence for its entire valid life history.

Unique keys are not sufficient for referential integrity because their role is only to guarantee uniqueness, i.e., that at a particular point in valid time only one entity occurrence has that value. With unique keys there can be periods of valid time where a value is not used in any row and furthermore that value can be reused by any entity occurrence.

Additional foreign constraint rules are defined to keep referential integrity intact with respect to the Start of Existence (SOE) and End of Existence (EOE) of related rows when certain events occur.

The following are events that effect the SOE and EOE of a row:

The "Insert" event where the entity occurrence is created and the Start of Existence (SOE) is recorded in the database.

The "Alter Insert Forward" event where the SOE is changed to a later valid time.

The "Alter Insert Back" event where the SOE is changed to an earlier valid time.

The "Delete" event where the End of Existence of an entity occurrence is set.

The "Alter Delete Forward" event where the EOE is changed to a later valid time.

The "Alter Delete Back" event where the EOE is changed to an earlier valid time.

The "Transfer Foreign Key" event where the SOE and EOE of a row are potentially affected by the SOE and EOE of the new parent row.

When events occur that may compromise temporal referential integrity, additional constraint rules (defined against the foreign key) are used to determine the value of the foreign key column in the related entity.

In "ordinary" non-temporal tables, Oracle implements two referential constraint rules, i.e., Restrict (the default) and Cascade which can be attached to a DELETE event. Theoretically, there are two more constraint rules, i.e., Nullifies and Defaults, but these are not implemented in the Oracle code base.

There are five events where each event that could affect the Start of Existence (SOE) or End of Existence (EOE) of a row. The constraint rules are:

The "Cascade Rule", where the effect on the parent is inherited by the children.

The "Restrict Rule", where the effect on the parent is not allowed if children exist at that valid time.

The "Bounded Rule", where the effect on the parent is limited by the existence of children at that valid time.

The "Nullify Rule", where the effect on the parent is inherited by the children and the foreign key is set to null.

The "Default Rule", where the effect on the parent is inherited by the children and the foreign key is set to a default value.

All combinations of Events and Rules are possible, but some are direct equivalents of each other and some have limited business use. As with existing constraints currently provided by Oracle and other database environments, it would be optional to provide all possible combinations in an implementation of TRE.

TRE Data Storage

There are potentially a number of ways of implementing TRE. For one implementation of TRE each table in the business data model is implemented in the TRE storage layer as three underlying tables using standard database facilities, e.g., standard constraints and indexes as provided within the Oracle database system.

Figure 3:
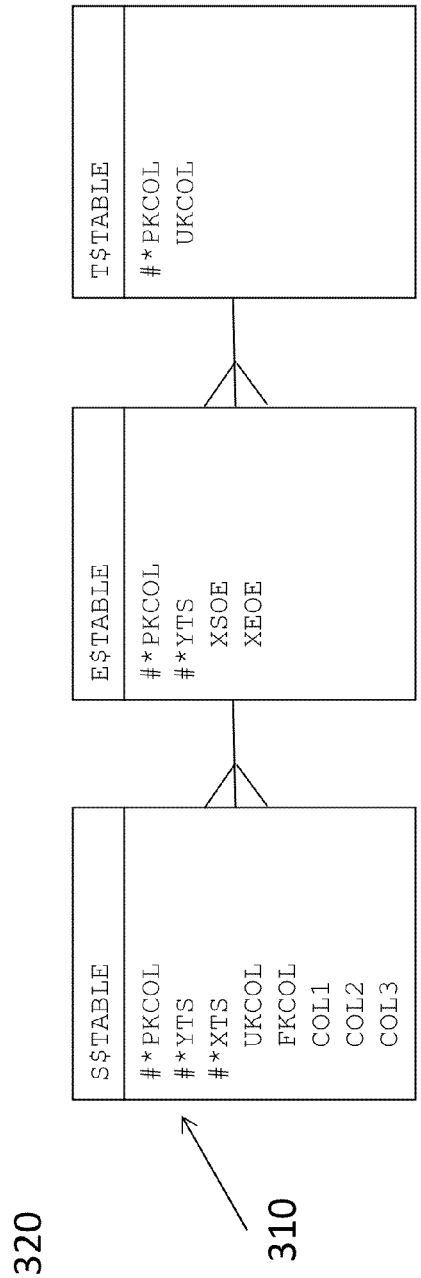
FIG. 3 shows three tables used by a database embodying the present invention, S$, E$ and T$ tables.

With reference to FIG. 3, 310 shows the relationships between the three tables in the TRE storage layer representing a single table in a business data model.

The three tables (S$, E$ and T$) depicted by 310 in FIG. 3 provide the following functions:

S$TABLENAME (S$) is called the Summary (S$) table and holds all the versions of all the rows. The rows are identified/dimensioned by Transaction Time, Valid Time and Business Primary Key.

E$TABLENAME (E$) is called the Event (E$) table. It holds the valid start of existence (insert) and valid end of existence (delete) of all rows and avoids the problem of storing the end dates of row versions in the Summary table. It is acceptable to hold the end of existence in this table because, by definition, there is no row to overlap/or create a gap with after deletion. The TRE semantics of a Primary Key also guarantee that no subsequent rows occur in valid time with the same primary key value. The rows are identified/dimensioned by Transaction Time and Business Primary Key.

T$TABLE (T$) is called the T$ table. It holds the Primary key and Unique Key(s) of all the rows and is used as the locking mechanism to ensure the Primary Keys and Unique Key semantics are observed. The rows are dimensioned by Business Primary Key only and the table has standard Primary and Unique key constraints applied to it.

The Presentation Layer

The role of a "normal" table in the "3 table" TRE implementation is taken by the TABLENAME view which 'hides' the three underlying tables from the eyes of the developer.

Since the underlying TRE storage layer implicitly supports both valid and transaction time, it gives us the opportunity to provide two very useful additional views of the data, namely TABLENAME_Y and TABLENAME_X.

The _Y naming convention means a view with a fixed Y (or transaction) time can be provided, i.e., it gives the valid time history (a horizontal slice) where valid time is conceptually seen from left to right.

The _X naming convention means a view with a fixed X (or valid time) time can be provided, i.e., it gives the transaction time history (a vertical slice), where transaction time is conceptually seen going from top to bottom.

Figure 4:
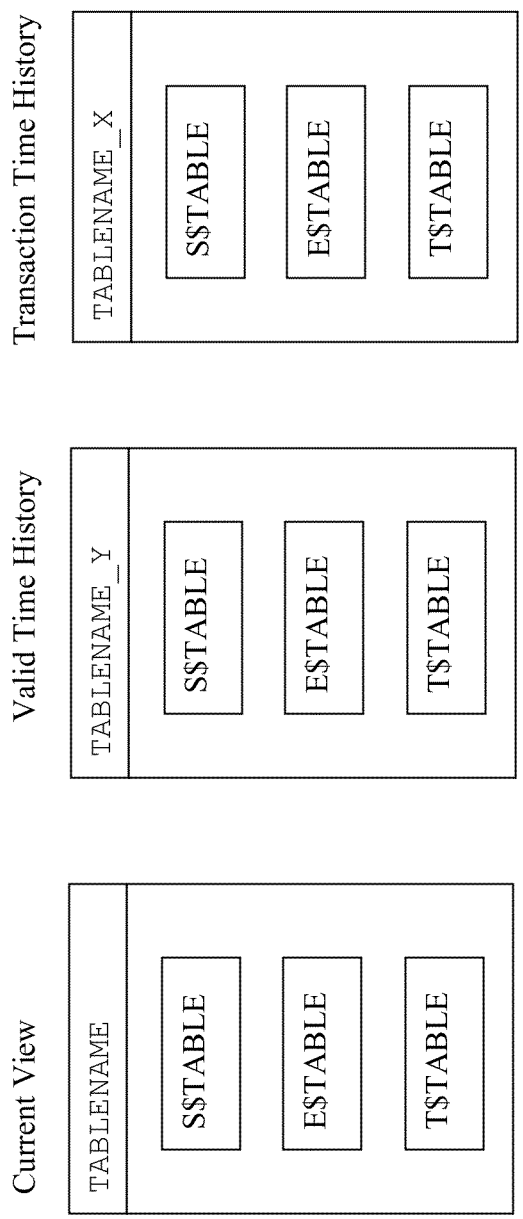
FIG. 4 shows three available views of data in the database of FIG. 3, achievable using the tables of FIG. 3.

FIG. 4 shows the three available 'views'.

The TRE "TABLENAME" view provides the "Normal" or "current view" table equivalent. It is used for Data Manipulation Language (DML) operations and SELECT (query) operations. It provides values for a set of rows for a given valid time and transaction time. In one implementation, this view uses instead-of triggers to deal with INSERT, UPDATE and DELETE events. The instead-of triggers use the constraint rules to populate the underlying tables according to the semantic rules of TRE.

The TRE "TABLENAME_Y" view provides the Valid Time History view and is used for SELECT operations and to navigate through the valid life history of the rows. It provides a valid time history (time series) of values for a set of rows for a given transaction time.

The TRE "TABLENAME_X" view provides Transaction Time History View and is used for SELECT and to navigate through the transaction life history of the rows. It provides a transaction time history (time series) of values for a set of rows for a given valid time.

In addition to displaying the business data, in one implementation these views also display the following pseudo columns back to the user:

The Pseudo Column "YTS" provides the Transaction Time which is the time that the row was committed to the database. This is also known as the Y-Timestamp.

The Pseudo Column "SOE" provides the Start of Existence which is the valid time of the insert event.

The Pseudo Column "EOE" provides the End of Existence which is the valid time of the delete event (if one exists).

The Pseudo Column "SOV" provides the Start of Valid which is the valid time that a version of the row acquired its values and is the same as SOE for the first version of the row. This is also known as the X-timestamp.

The Pseudo Column "EOV" provides the End of Valid which is the valid time that the next version of the row acquired its values (if one exists). Unlike other pseudo columns, the EOV value is not stored on the same row. It is derived from the SOV of the next row version.

Pseudo Code for the Current View

The pseudo code below shows how the E$ and S$ tables are used to provide a row version for a given valid and given transaction time.

```
SELECT
    S.columnvalue1, S.columnvalue2, ...,
FROM
    Event E, Summary S
WHERE s.businessid = e.businessid
  AND s.transtime = e.transtime
  AND s.validtime = (maximum validtime <= given validtime)
  AND e.transtime = (maximum transtime <= given transtime)
  AND given validtime between SOE and EOE (if it exists)
```

Applying TRE to an Investment Bank Reporting Requirement: Problem Definition Investment banks trade currencies on the futures exchange markets for their clients. At the end of each day of trading, the banks produce client reports which show the cumulative Profit and Loss (P/L) for each account. This would be relatively straight forward if all trades were entered on time and with no errors but in fact the banks have to issue corrected reports to take into account late trades, ghost trades, and data corrections in rates and quantities. When a corrected report is issued the bank also has to reconcile the original report with the corrected report. This reconciliation activity is very costly and difficult, often involving transfer of data from the transactional systems to populate complicated data warehousing structures.

Schema

Figure 5:
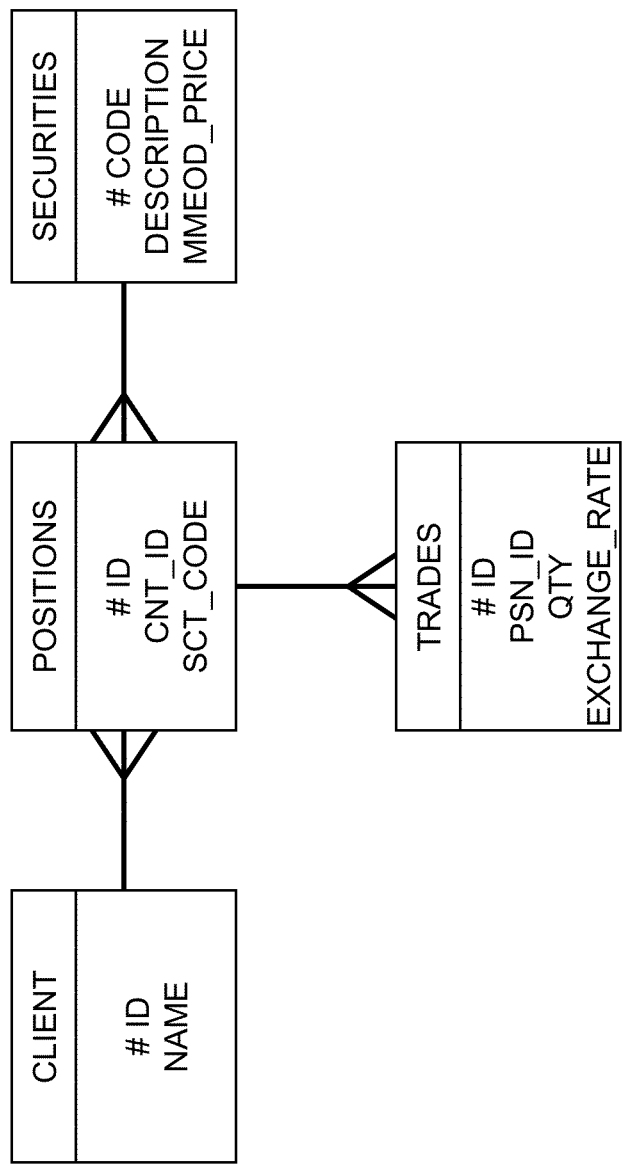
FIG. 5 depicts example considerations when designing a database relating to trading currencies.

When TRE is used the solution becomes trivial. This example shows how 4 simple tables can produce the required client report. The schema in FIG. 5 represents what the application developer needs to consider i.e. the business data. Note that the schema does not have any dates or additional tables for history and audit. This is because time has been separated (or factored away from) the business data.

Dates are never directly updated by the user. Instead they are provided at statement level using SQL syntax. Dates are managed and stored by the infrastructure but are available as pseudo columns (not shown in FIG. 5 schema diagram).

Client Report

FIG. 6 shows a printout of a typical client report used by banks for trade reconciliation.

Results

The SQL output provided by one implementation of TRE is shown below. Notice that the SQL query uses standard relational joins and that the same SQL query is run at different transaction and valid times in order to provide the reconciliation between different versions of the report. This is a good example of how time is supplied at the statement level.

Stepping Through Valid Time

First we look at the data in the context of Transaction Time NOW, i.e., the most current knowledge we have including all corrections and late trades. Stepping through Valid Time we see that the same SQL provides different results at different valid times. This is analogous to Oracle Flashback Query but applied to valid time. For clarity, we assume the same mid market end of day price (MMEOD) on each valid time day.

```
At transaction Time NOW
At Valid Time 6th June 2005
SQL> select to_char(T.SOV,'DD-MON-YYYY') "Trade Dt"    ,
  2              to_char(T.EOE,'DD-MON-YYYY') "Value Date"          ,
  3              T.QTY                                "YouBought(Sold)" ,
  4              EXCHANGE_RATE                        "Traded Rate"   ,
  5              T.QTY*T.EXCHANGE_RATE*-1    "YouBought(Sold)" ,
  6              (S.MMEOD_PRICE*T.QTY)+(T.QTY*T.EXCHANGE_RATE*-1 ) "P/L Inception TD",
  7              S.MMEOD_PRICE                                       "Reval Fwd Rt"
  8    from     TRADES_Z       T,
  9             SECURITIES     S,
 10             POSITIONS      P
 11    where    T.PSN_ID       = P.ID
 12    and      P.SCT_CODE     = S.CODE
 13    order by T.EOE, T.SOV
 14  /
```

| Trade Dt | Value Date | YouBought(Sold) | Traded Rate | YouBought(Sold) | P/L Inception TD | Reval Fwd Rt |
|---|---|---|---|---|---|---|
| 06-JUN-2005 | 09-SEP-2005 | −1801000 | .759 | 1366959 | 5403 | .756 |

At transaction Time NOW
At Valid Time 21st June 2005
```
SQL> select to_char(T.SOV,'DD-MON-YYYY') "Trade Dt"     ,
  2          to_char(T.EOE,'DD-MON-YYYY') "Value Date"    ,
  3          T.QTY                         "YouBought(Sold)" ,
  4          EXCHANGE_RATE                 "Traded Rate"    ,
  5          T.QTY*T.EXCHANGE_RATE*-1      "YouBought(Sold)" ,
  6          (S.MMEOD_PRICE*T.QTY)+(T.QTY*T.EXCHANGE_RATE*-1 ) "P/L Inception TD",
  7          S.MMEOD_PRICE                                "Reval Fwd Rt"
  8   from   TRADES_Z     T,
  9          SECURITIES   S,
 10          POSITIONS    P
 11   where  T.PSN_ID     = P.ID
 12   and    P.SCT_CODE   = S.CODE
 13   order by T.EOE, T.SOV
 14   /
```

| Trade Dt | Value Date | YouBought(Sold) | Traded Rate | YouBought(Sold) | P/L Inception TD | Reval Fwd Rt |
|---|---|---|---|---|---|---|
| 06-JUN-2005 | 09-SEP-2005 | −1801000 | .759 | 1366959 | 5403 | .756 |
| 21-JUN-2005 | 09-SEP-2005 | 241000 | .749 | −180509 | 1687 | .756 |

At transaction Time NOW
At Valid Time 14th July 2005
```
SQL> select to_char(T.SOV,'DD-MON-YYYY') "Trade Dt"     ,
  2          to_char(T.EOE,'DD-MON-YYYY') "Value Date"    ,
  3          T.QTY                         "YouBought(Sold)" ,
  4          EXCHANGE_RATE                 "Traded Rate"    ,
  5          T.QTY*T.EXCHANGE_RATE*-1      "YouBought(Sold)" ,
  6          (S.MMEOD_PRICE*T.QTY)+(T.QTY*T.EXCHANGE_RATE*-1 ) "P/L Inception TD",
  7          S.MMEOD_PRICE                                "Reval Fwd Rt"
  8   from   TRADES_Z     T,
  9          SECURITIES   S,
 10          POSITIONS    P
 11   where  T.PSN_ID     = P.ID
 12   and    P.SCT_CODE   = S.CODE
 13   order by T.EOE, T.SOV
 14   /
```

| Trade Dt | Value Date | YouBought(Sold) | Traded Rate | YouBought(Sold) | P/L Inception TD | Reval Fwd Rt |
|---|---|---|---|---|---|---|
| 06-JUN-2005 | 09-SEP-2005 | −1801000 | .759 | 1366959 | 5403 | .756 |
| 21-JUN-2005 | 09-SEP-2005 | 241000 | .749 | −180509 | 1687 | .756 |
| 14-JUL-2005 | 09-SEP-2005 | −391000 | .747 | 292077 | −3519 | .756 |

At transaction Time NOW
At Valid Time 20th July 2005
```
SQL> select to_char(T.SOV,'DD-MON-YYYY') "Trade Dt"     ,
  2          to_char(T.EOE,'DD-MON-YYYY') "Value Date"    ,
  3          T.QTY                         "YouBought(Sold)" ,
  4          EXCHANGE_RATE                 "Traded Rate"    ,
  5          T.QTY*T.EXCHANGE_RATE*-1      "YouBought(Sold)" ,
  6          (S.MMEOD_PRICE*T.QTY)+(T.QTY*T.EXCHANGE_RATE*-1 ) "P/L Inception TD",
  7          S.MMEOD_PRICE                                "Reval Fwd Rt"
  8   from   TRADES_Z     T,
  9          SECURITIES   S,
 10          POSITIONS    P
 11   where  T.PSN_ID     = P.ID
 12   and    P.SCT_CODE   = S.CODE
 13   order by T.EOE, T.SOV
 14   /
```

| Trade Dt | Value Date | YouBought(Sold) | Traded Rate | YouBought(Sold) | P/L Inception TD | Reval Fwd Rt |
|---|---|---|---|---|---|---|
| 06-JUN-2005 | 09-SEP-2005 | −1801000 | .759 | 1366959 | 5403 | .756 |
| 21-JUN-2005 | 09-SEP-2005 | 241000 | .749 | −180509 | 1687 | .756 |
| 14-JUL-2005 | 09-SEP-2005 | −391000 | .747 | 292077 | −3519 | .756 |
| 20-JUL-2005 | 09-SEP-2005 | 1951000 | .767 | −1496417 | −21461 | .756 |

Stepping Through Transaction Time

Now we will look at the data in the context of Transaction Time PAST, i.e., what we thought we knew prior to corrections being applied. We choose a valid time of 29 Jul. 2005 and step back in transaction time.

---

At Valid Time 29$^{th}$ July 2005
At Transaction Time before the late trade for 21$^{st}$ June 2005 was added

```
SQL> select to_char(T.SOV,'DD-MON-YYYY') "Trade Dt"    ,
  2           to_char(T.EOE,'DD-MON-YYYY') "Value Date"    ,
  3           T.QTY                        "YouBought(Sold)" ,
  4           EXCHANGE_RATE                "Traded Rate"   ,
  5           T.QTY*T.EXCHANGE_RATE*-1     "YouBought(Sold)" ,
  6           (S.MMEOD_PRICE*T.QTY)+(T.QTY*T.EXCHANGE_RATE*-1 ) "P/L Inception TD",
  7           S.MMEOD_PRICE                                 "Reval Fwd Rt"
  8   from       TRADES_Z    T,
  9              SECURITIES  S,
 10              POSITIONS   P
 11   where      T.PSN_ID    = P.ID
 12   and        P.SCT_CODE  = S.CODE
 13   order by T.EOE, T.SOV
 14   /
```

| Trade Dt | Value Date | YouBought(Sold) | Traded Rate | YouBought(Sold) | P/L Inception TD | Reval Fwd Rt |
|---|---|---|---|---|---|---|
| 06-JUN-2005 | 09-SEP-2005 | −1801000 | .759 | 1366959 | 5403 | .756 |
| 14-JUL-2005 | 09-SEP-2005 | −391000 | .747 | 292077 | −3519 | .756 |
| 20-JUL-2005 | 09-SEP-2005 | 1951000 | .767 | −1496417 | −21461 | .756 |

---

At Valid Time 29$^{th}$ July 2005
At Transaction Time after the late trade was added but before traded rate was corrected

```
SQL> select to_char(T.SOV,'DD-MON-YYYY') "Trade Dt"    ,
  2           to_char(T.EOE,'DD-MON-YYYY') "Value Date"    ,
  3           T.QTY                        "YouBought(Sold)" ,
  4           EXCHANGE_RATE                "Traded Rate"   ,
  5           T.QTY*T.EXCHANGE_RATE*-1     "YouBought(Sold)" ,
  6           (S.MMEOD_PRICE*T.QTY)+(T.QTY*T.EXCHANGE_RATE*-1 ) "P/L Inception TD",
  7           S.MMEOD_PRICE                                 "Reval Fwd Rt"
  8   from       TRADES_Z    T,
  9              SECURITIES  S,
 10              POSITIONS   P
 11   where      T.PSN_ID    = P.ID
 12   and        P.SCT_CODE  = S.CODE
 13   order by T.EOE, T.SOV
 14   /
```

| Trade Dt | Value Date | YouBought(Sold) | Traded Rate | YouBought(Sold) | P/L Inception TD | Reval Fwd Rt |
|---|---|---|---|---|---|---|
| 06-JUN-2005 | 09-SEP-2005 | −1801000 | .759 | 1366959 | 5403 | .756 |
| 21-JUN-2005 | 09-SEP-2005 | 241000 | .77785 | −187461.85 | −5265.85 | .756 |
| 14-JUL-2005 | 09-SEP-2005 | −391000 | .747 | 292077 | −3519 | .756 |
| 20-JUL-2005 | 09-SEP-2005 | 1951000 | .767 | −1496417 | −21461 | .756 |

---

At Valid Time 29$^{th}$ July 2005
At Transaction Time after the late trade was added and after the traded rate was corrected

```
SQL> select to_char(T.SOV,'DD-MON-YYYY') "Trade Dt"    ,
  2           to_char(T.EOE,'DD-MON-YYYY') "Value Date"    ,
  3           T.QTY                        "YouBought(Sold)" ,
  4           EXCHANGE_RATE                "Traded Rate"   ,
  5           T.QTY*T.EXCHANGE_RATE*-1     "YouBought(Sold)" ,
  6           (S.MMEOD_PRICE*T.QTY)+(T.QTY*T.EXCHANGE_RATE*-1 ) "P/L Inception TD",
  7           S.MMEOD_PRICE                                 "Reval Fwd Rt"
  8   from       TRADES_Z    T,
  9              SECURITIES  S,
 10              POSITIONS   P
 11   where      T.PSN_ID    = P.ID
 12   and        P.SCT_CODE  = S.CODE
 13   order by T.EOE, T.SOV
 14   /
```

| Trade Dt | Value Date | YouBought(Sold) | Traded Rate | YouBought(Sold) | P/L Inception TD | Reval Fwd Rt |
|---|---|---|---|---|---|---|
| 06-JUN-2005 | 09-SEP-2005 | −1801000 | .759 | 1366959 | 5403 | .756 |
| 21-JUN-2005 | 09-SEP-2005 | 241000 | .749 | −180509 | 1687 | .756 |
| 14-JUL-2005 | 09-SEP-2005 | −391000 | .747 | 292077 | −3519 | .756 |
| 20-JUL-2005 | 09-SEP-2005 | 1951000 | .767 | −1496417 | −21461 | .756 |

Performance

In order to show that TRE performs with large quantities of data, the TRE database schema for the above report was loaded with 22.4 million rows. A new transaction then was then added and the report was re run. This data volume represents approximately one month of trading for a large investment bank. In order to produce this report without TRE, there typically needs to be a costly and time consuming data extraction at the end of each day from the transactional trading system and into a reporting data warehouse. In this demonstration, the report was queried from the same database that held the transactional data. The results of the performance testing are shown in FIG. 7.

Attention: these test were performed on a commodity windows PC, with a single quad core CPU with 4 GB of memory and a default Oracle 11gR1 database installation.

FIG. 8 shows an example of SQL script for producing a report using the present invention methodology. The user sets the transaction time (for example 6 Jun. 2005, 9:30 AM) that they wish to pretend is the time at which the query was made—that is, s time that they wish to have as the point in time for the query. The system has a default which sets to current view (now) if no transaction time is entered to be a different time at which the system asks the query (the internal computer clock obviously sets the system time/transaction time when transactions are entered into the system).

The selection of the transaction time determines which of the summary positions for the entity is referred to when making the query.

FIGS. 9 to 12 illustrate a timestamp approach. FIG. 1 refers to first normal form through to fifth normal form.

FIG. 10 illustrates FROM and capital TO columns for valid time. FIG. 11 illustrates FROM and capital TO columns for transaction time—stored in the table. FIG. 12 illustrates that the timestamp approach is to store and index the FROM and TO columns in various ways. STORAGE use Period Data types or timestamps. For INDEXES (extensibility framework): RTREE Indexes are where FROM and TO are a simple form of Minimum Bounded Rectangles; BTREE Indexes are of unique combinations of FROM and TO; and ORACLE TIMEINDEX are of unique combinations of FROM and DURATION.

Figure 13:
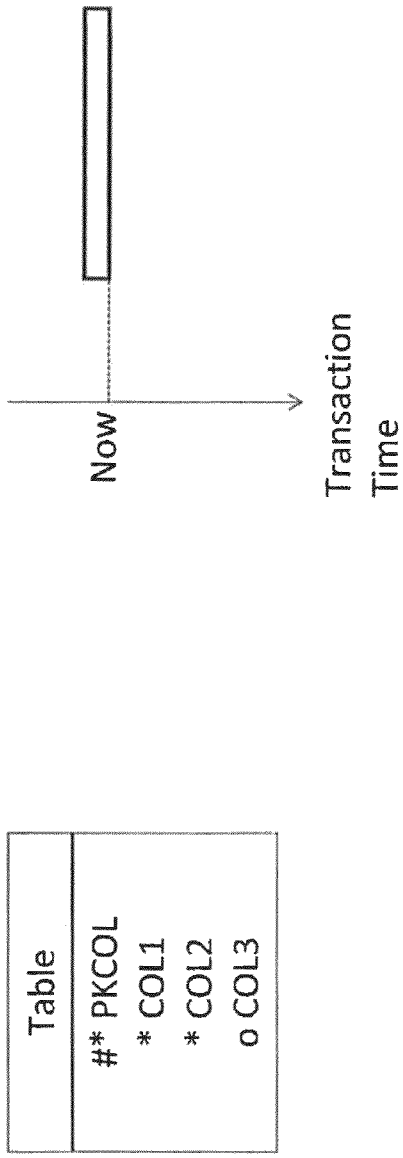

FIGS. 13 to 19 illustrate the new approach to handling time in bi-temporal databases. The transaction time (or computer clock system time) continues to run on the computer. When entries are entered into the computer they have a particular transaction time associated with them—the time they were really entered into the computer system. FIG. 13 shows this.

Figure 14:
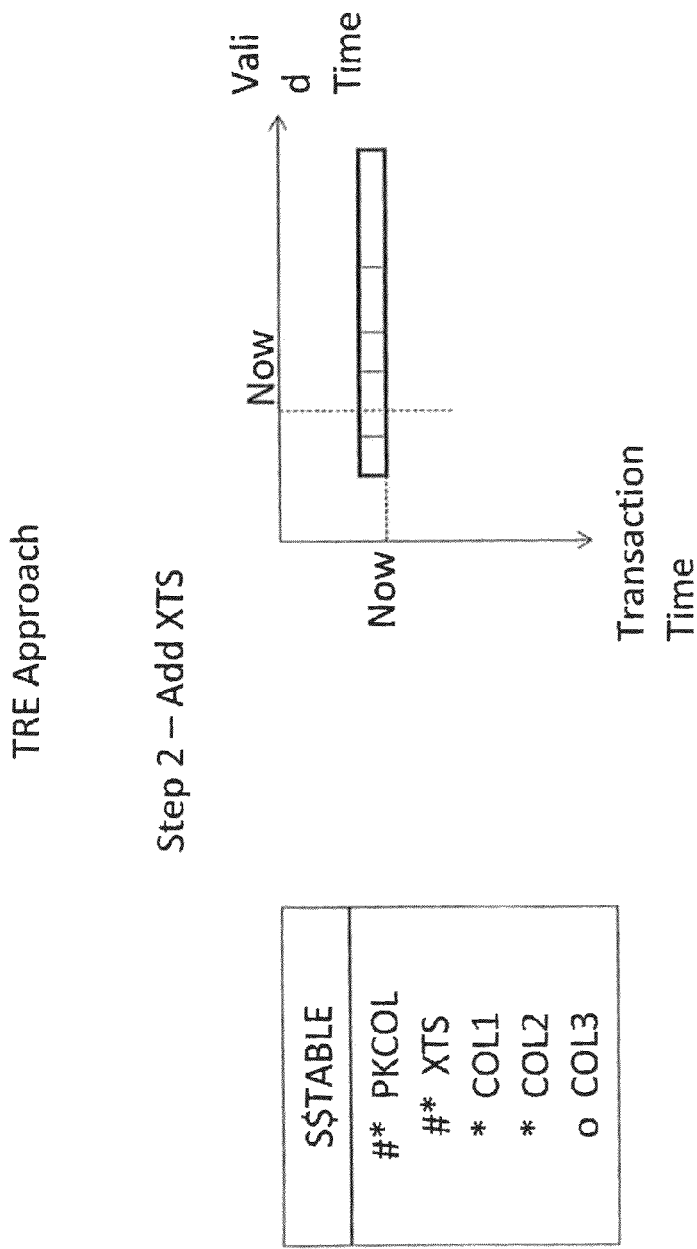

FIG. 14 illustrates the concept of giving an entity an allowable existence in the valid time—a second time dimension. Each entity has a start of existence time. The end of existence time can either be entered directly, or calculated from some other entry (for example the start of existence of a different value or entity).

Figure 15:
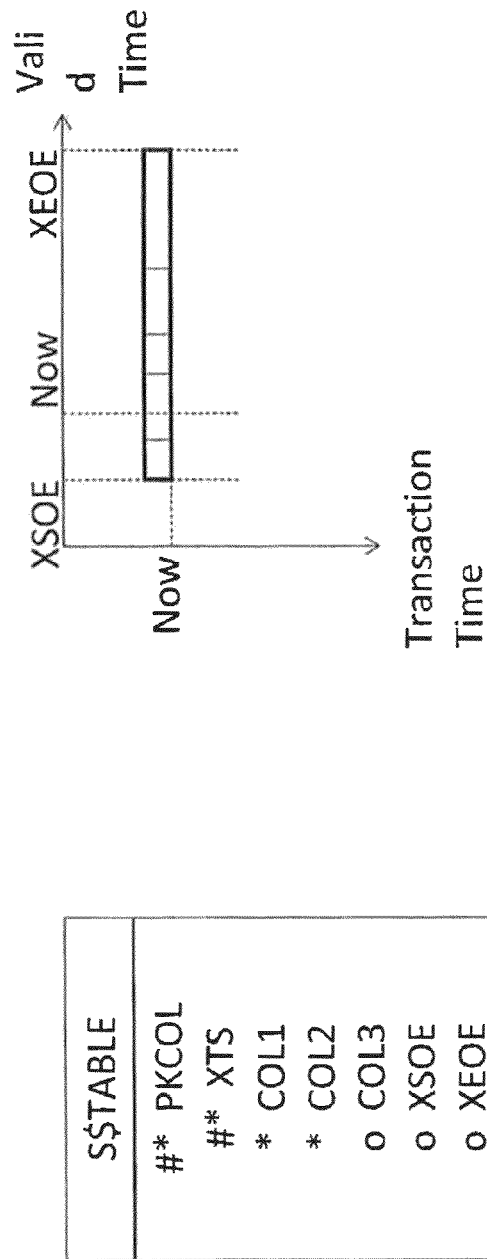

FIG. 15 shows the S $ table for an entity, being a summary table containing all versions of all rows of the business data of the entity, the rows having at least the dimensions of transaction time, valid time, and business primary key.

Figure 16:
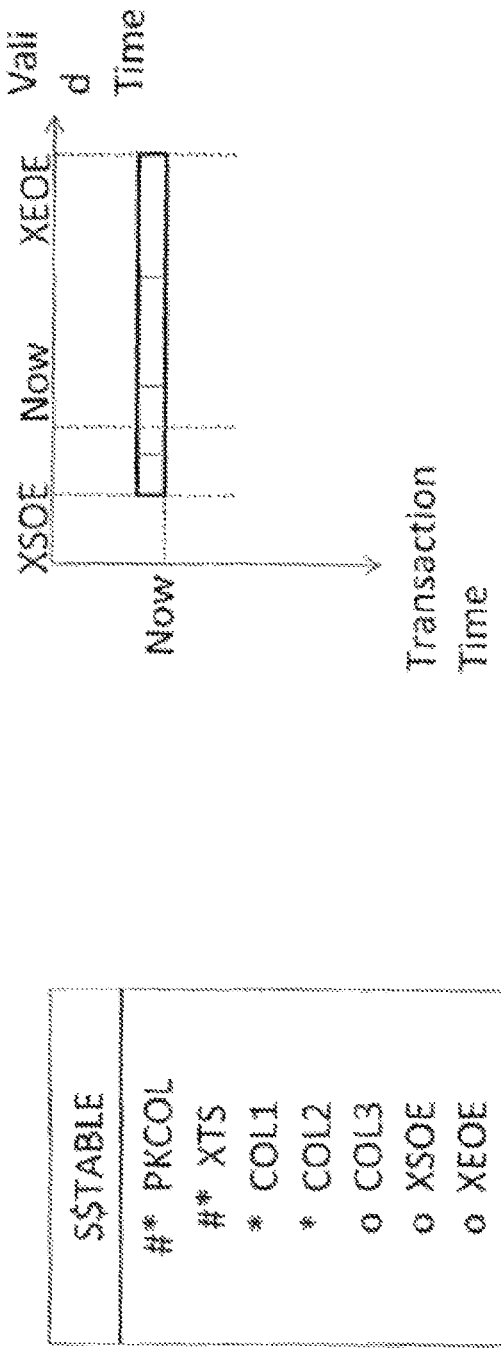

FIG. 16 illustrates another feature of determining the start of existence and end of existence time, in valid time for an entity. The valid time (X time) start of existence and end of existence could be determined by reading data in the existing rows, or entered in the s$ table directly. This is a de-normalisation step because XSOE and XEOE could in fact be determined by reading the data in the existing rows.

Figure 17:
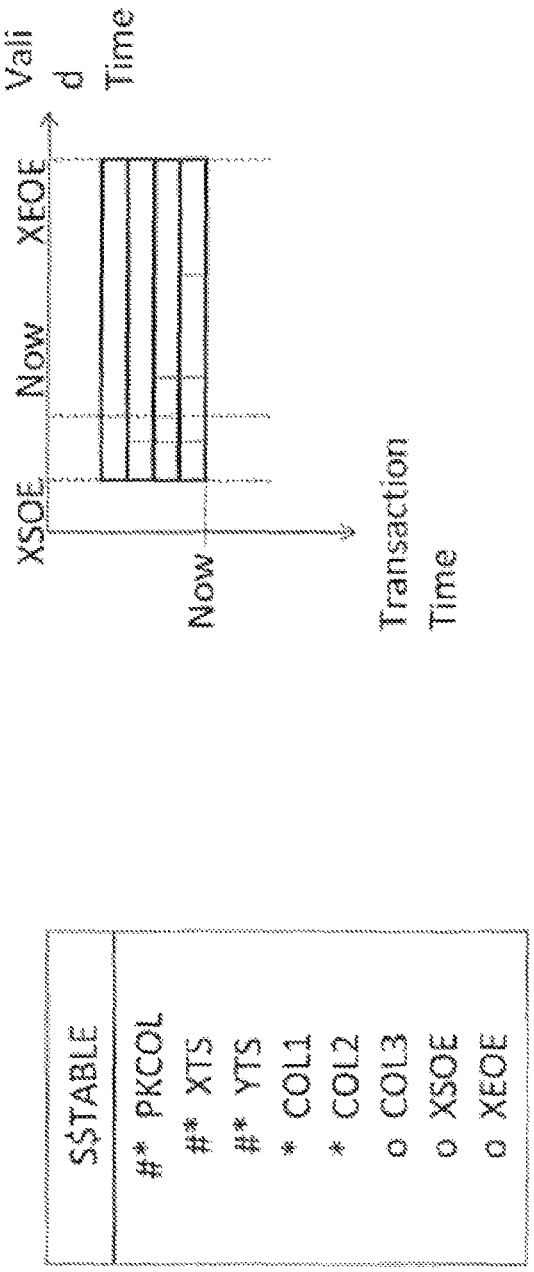

FIG. 17 indicates that a delete event is actually an insert event, where a new summary position row is created which represents the "deletion" by providing a value in the valid time for end of existence. For every event there must be ONE or MORE summary positions. This is a SNF form of the TRE because XSOE and XEOE do not depend on the entire primary key (PKCOL, YTS, XTS). In this form of TRE, a DELETE event creates a Summary Position row which represents the 'deletion' by providing a value in XEOE. Also, in this form of TRE a DELETE VACUUM in valid time is represented by setting both XSOE and XEOE to null.

FIG. 18 illustrates an E $ table, being an event table, that holds the valid start of existence and valid end of existence of all rows in the S$r table. This avoids the need to store end dates of rows in the S $, and the rows of the E $ table are dimensioned by at least transaction time and business primary key. It will be noted that the business primary key is present in both the S $ table and E $ table. This allows the two tables to be linked/referenced together. For every event there can be ZERO or MORE summary positions. This is a 3NF form of TMNF. This form of TRE brings the XSOE and XEOE columns into the E $ table. This form of TRE deals with DELETE VACUUM in valid time by creating an event row with no associated summary position row.

Figure 19:
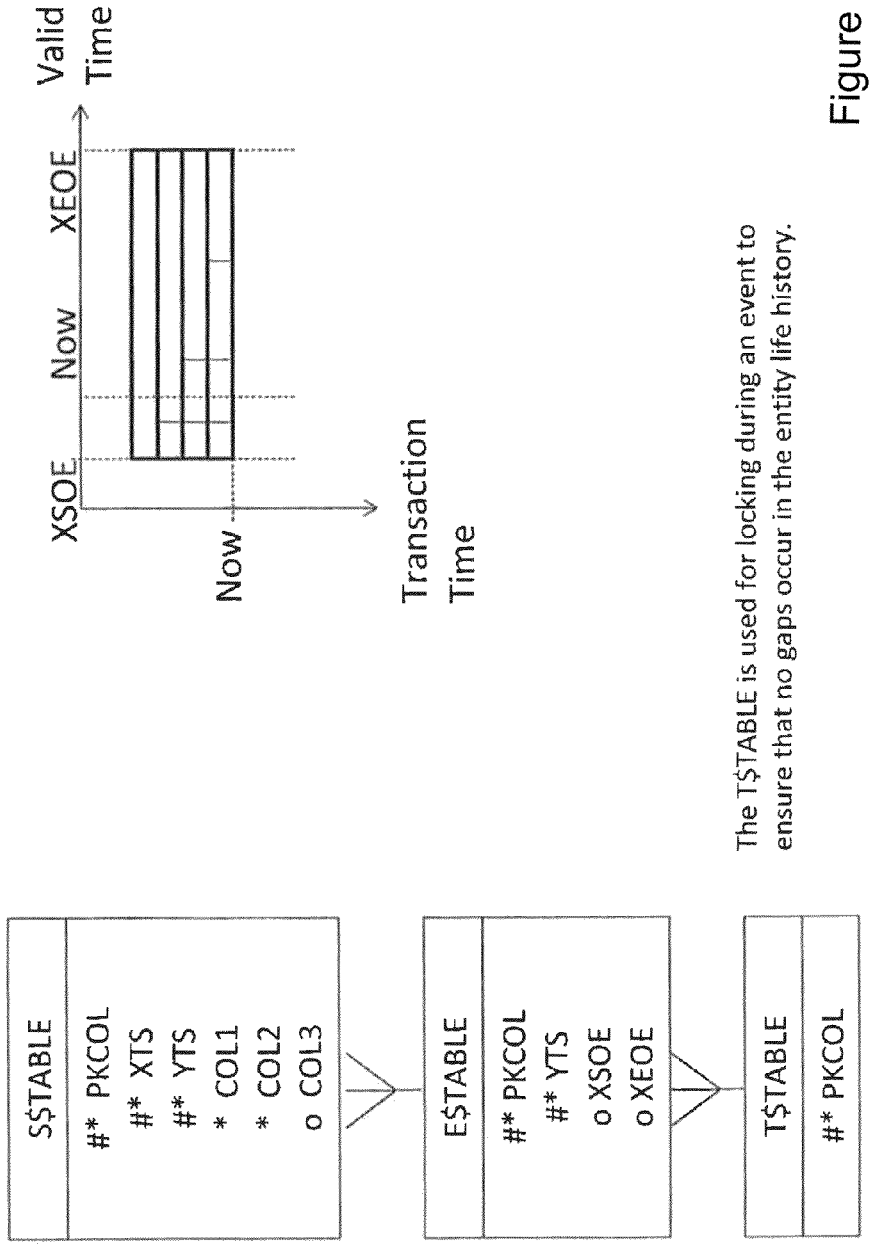

FIG. 19 shows a T $ table, which holds the primary key and unique keys all roles in the S $ table, and is dimensioned by business primary key. Again, it will be noted that the business primary key is present in all three of the S $, E $, and T $ tables, and is used to ensure that the correct tables are used when retrieving data from a query, and is used to ensure that the correct point in transaction time is selected, and the correct summary position is used to respond to a query of the database.

Figure 20:
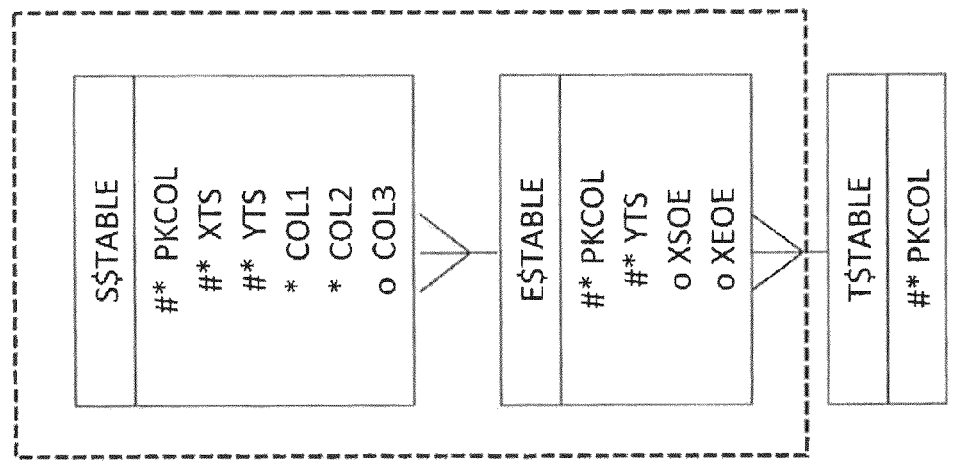
FIGS. 20 to 25 show an embodiment implementation of the approach and represent data structure of an embodiment of the new database.

FIG. 20 illustrates an implementation of the invention in which the E $ and S $ table are clustered.

Figure 21:
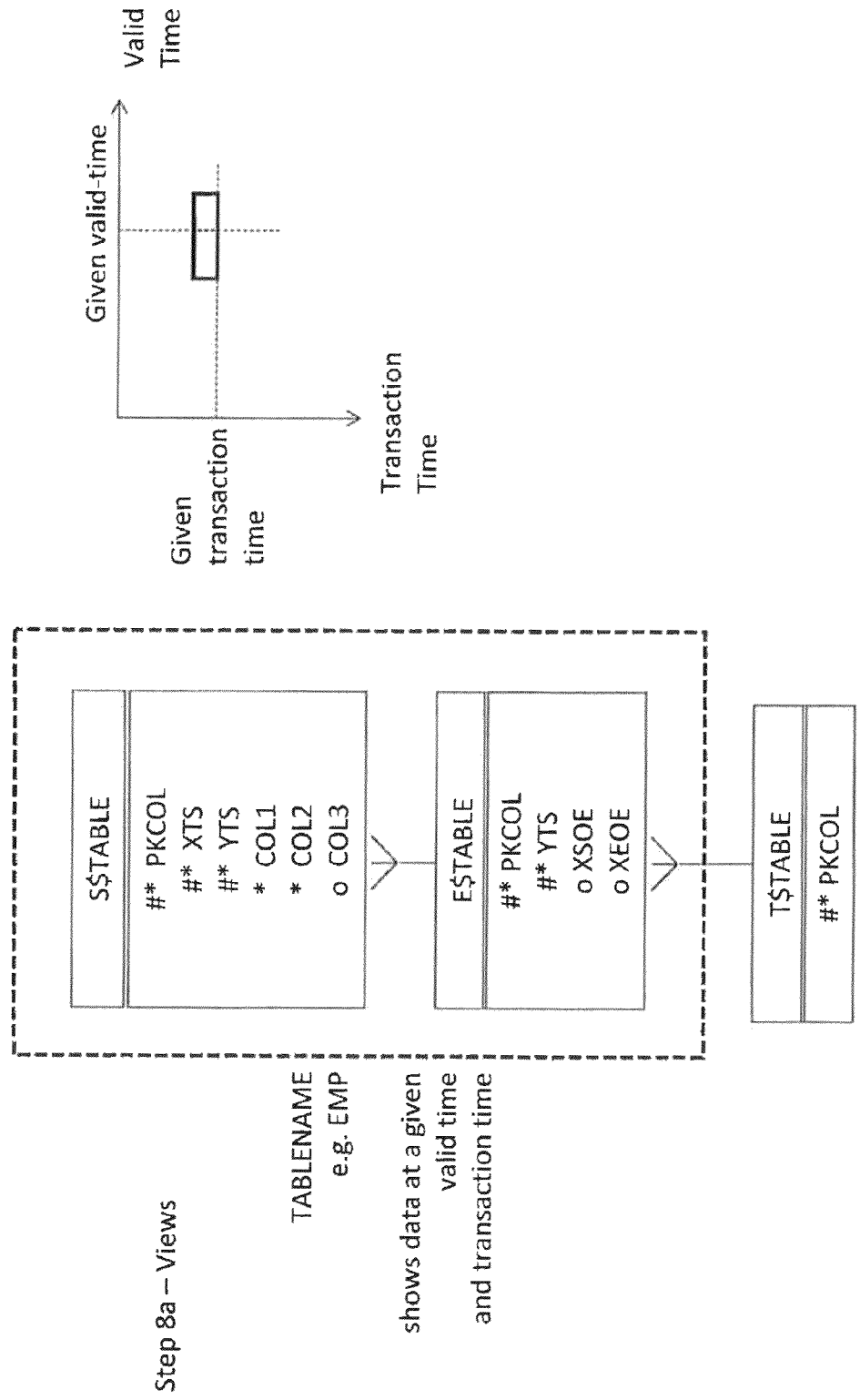

FIG. 21 shows further detail of an embodiment implementation, in which a query enters both a given valid time, and given transaction time and the two dimensions of time set "cross-hairs", to retrieve data representative of the position at both a given transaction time, and valid time.

The result retrieved for values of parameters associated with a data entry can be different for different transaction times-because the entries actually in the computer records/memory could be different at different points in transaction time.

Figure 22:
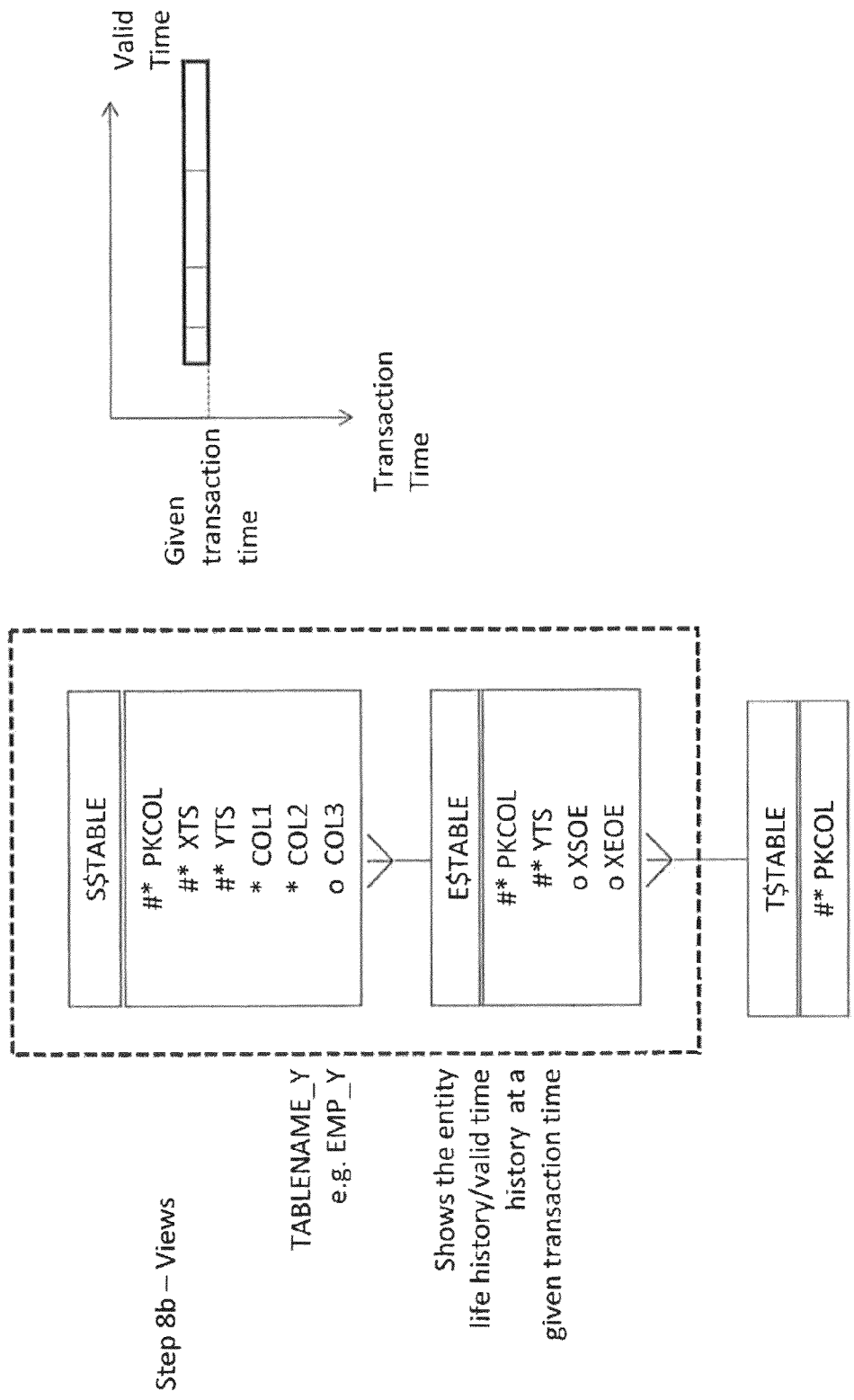

FIG. 22 shows a representation of a report view (the report could be displayed on a screen, printed out, sent electronically to another device (over the internet or a local network), stored in memory, etc.). The report view chosen shows the entity life history/valid time history at a given transaction time.

The previous report view of FIG. 21 showed data at it given valid time and transaction time. The report of FIG. 22 shows the history over valid time at a given transaction time.

Figure 23:
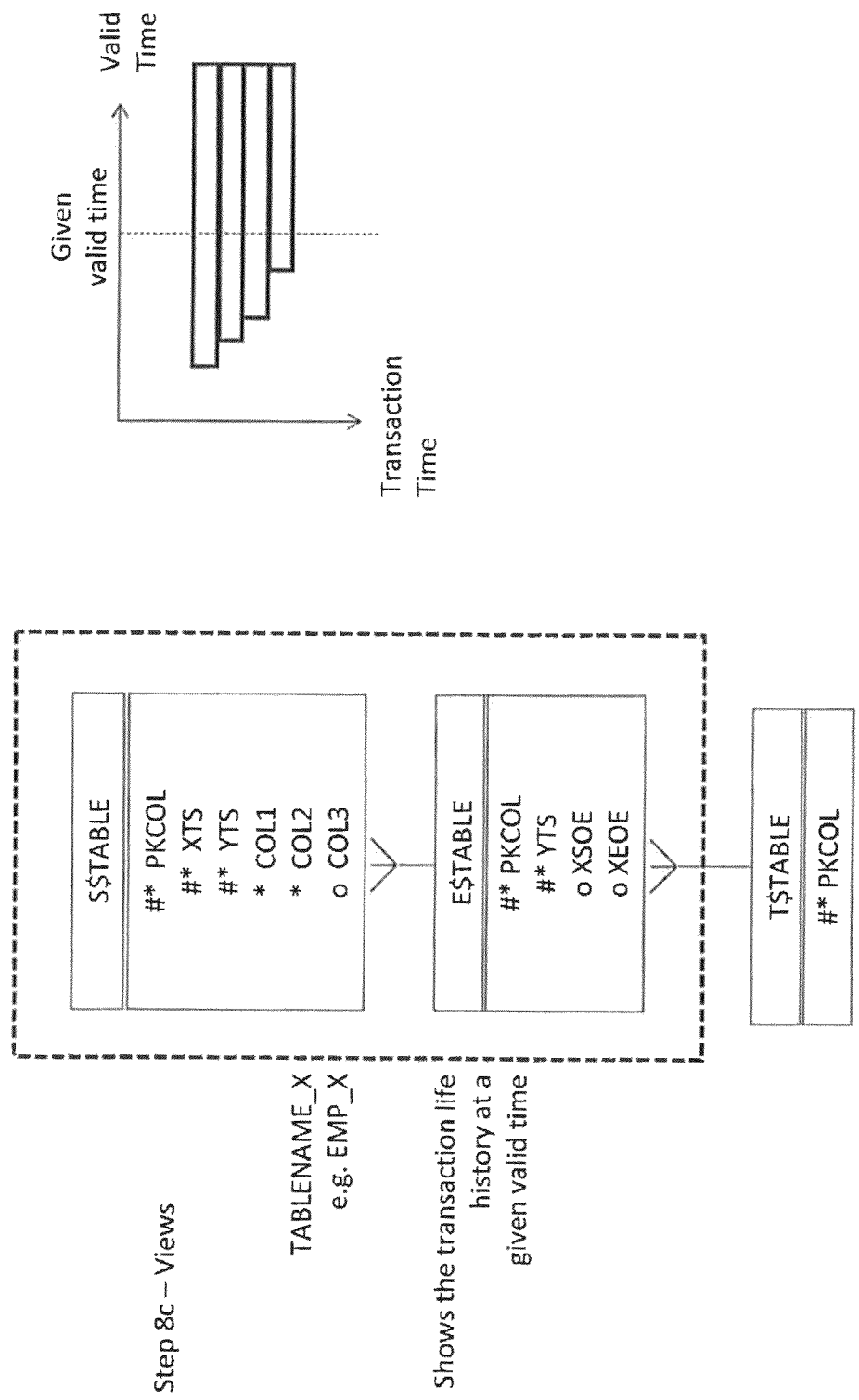

FIG. 23 shows another report/view that can be produced using the system, and that is to show the transaction life history of one or more attributes of an entity in the database at a given valid time.

Figure 24:
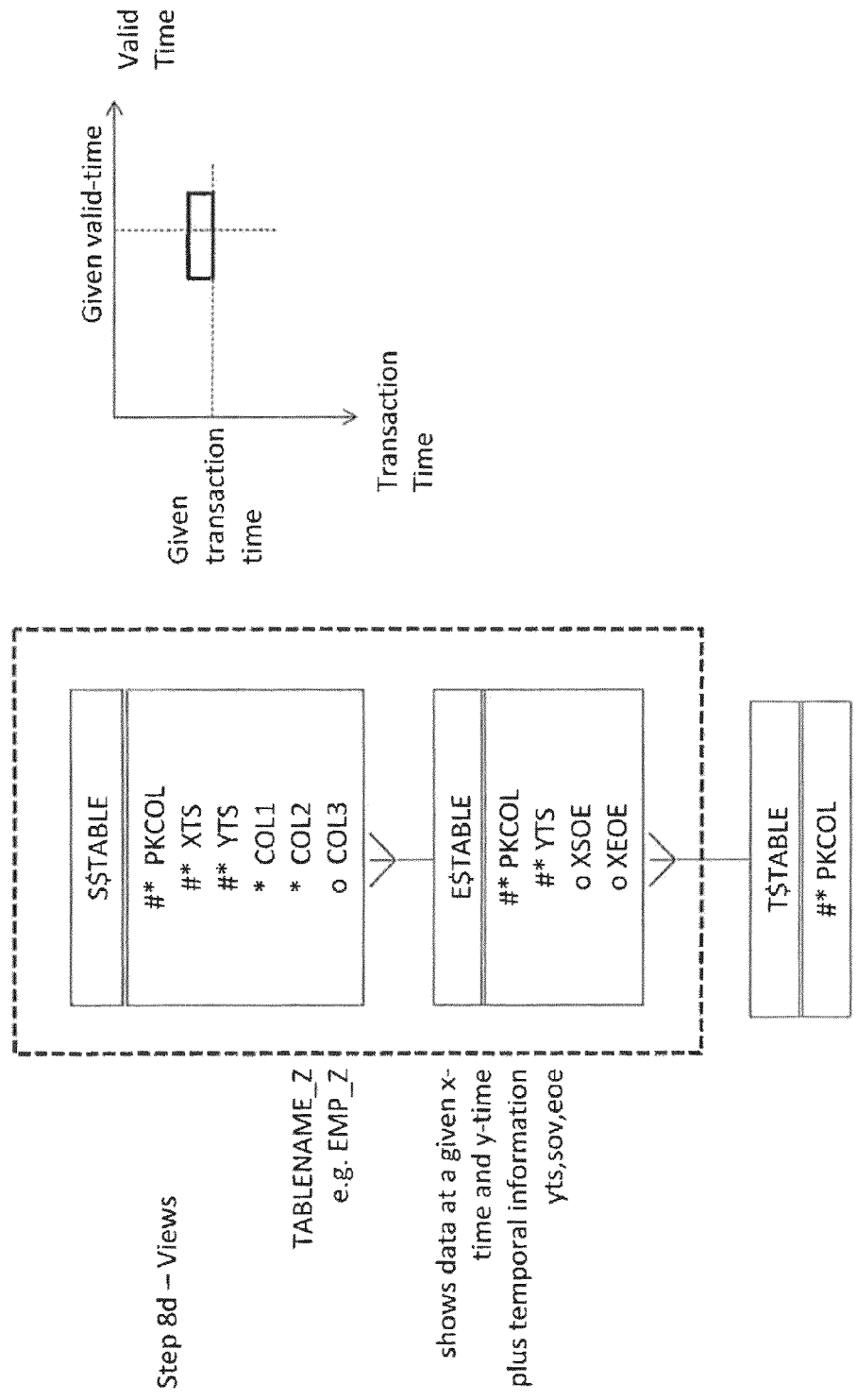

FIG. 24 illustrates another view, this time a view where the query that generates the report specifies a particular X time (valid time), and Y time (transaction time), and also provides temporal information (for example end of existence, start a value, etc).

Figure 25:
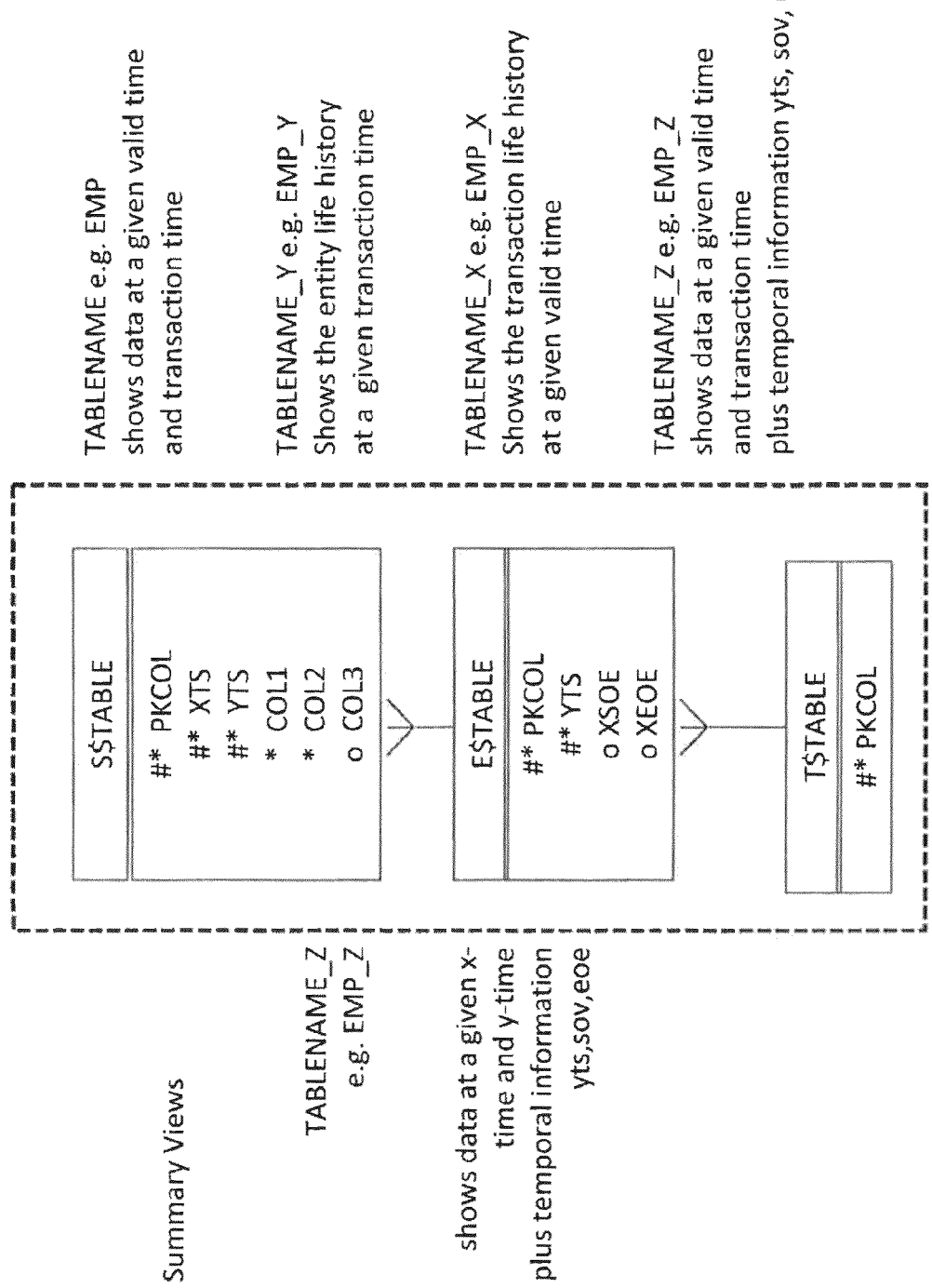

FIG. 25 shows another summary view where a user has input/a query has input a given X time and Y time, and the summary view is selected using both temporal inputs.

In summary, this implementation of TRE accommodated a real business requirement with the overall development taking only a few days due to the complexity being handled by the development strength of the invention.

It will be seen that the Temporal Relational Extension (TRE) methodology provides development and business benefits to applications by addressing the challenge of the time factor in data management.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VoIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

While the technology has been particularly shown and described with reference to specific illustrative embodiments, it should be understood that various changes in form and detail may be made without departing from the spirit and scope of the technology.

I claim:

1. A temporal relational database and associated data structure and database management software system comprising:
   computer memory and a computer processor adapted to process data held in the memory;
   business data and associated time data held in computer memory; and
   database management software held in computer memory and runable on the processor to interact with the business data;
   the data structure comprising having the business data and associated time data held in three tables, a first S$ table, a second T$ table and a third E$ table, where:
   the S$ table (summary table) contains all versions of the all rows of business data, the rows having at least dimensions of transaction time, valid time, and business primary key;
   the E$ table (event table) holds the valid start of existence and valid end of existence of all rows in the S$ table, avoiding storing end dates of rows in the S$ table, and the rows of the E$ table being dimensional by at least transaction time and business primary key;
   the T$ table holds the primary key and unique keys of all rows in the S$ table dimensioned by business primary key;
   and wherein the database management software when run on the processor allows:
   (i) the entry of new rows in the S$ table with the transaction time being set by the system clock and the valid time and business data being manually entered or read/generated by the processor, entries in the S$, E$ and T$ tables being automatically generated by the database management software; and
   (ii) allows a user to query the database to select a current view report with valid time now, or a report where both valid time and transaction time are specified by the user, the report showing the values of entities in the S$ table specified by the selected valid and transaction time dimensions; and
   (iii) a report of entities showing start and end times for entities to be generated, with the actual start and end of existence times being held in the T$ table; and (iv) a valid time history view of values of entities to be obtained, and a transaction time history view of values of entities can be obtained; and wherein referential rules managing values of entities are stored in a referential rule dictionary and control relational aspects of values of the entities.

2. A system according to claim 1 wherein the management software also enable pseudo tables to be generated and displayed or communicated to a user, the pseudo tables having values for foreign keys of primary key-identified entities, and having generated by the management software one, two, three, four or five of:

(i) a transition time (YTS) column indicating the time that a row in the S$ table was committed to the database;

(ii) a start of existence (SOE) time that is the valid time of an insert event into the S$ table, (iii) and an end of existence (EOE) time (if one exists for the value) that is the valid time of a delete event for the property of the entity in a row of the S$ table;

(iv) a start of valid (SOV) column that is the valid time that a version of the row in the S$ table acquired its values; and (v) end of valid (EOV) column that is the valid time that the next version of that row in the S$ table acquired its values; and wherein the EOV is not stored in the same row of the S$ table as the primary key to which it relates, but is derived from the SOV of the next (in transaction time) row version from that primary key.

3. A method of reducing the time taken to manufacture a bitemporal relational database comprising manufacturing a system according to claim 1 and designing business database tables with relational rules stored in a relational kernel or referential rule dictionary, and designing those tables so as to be without start date and end date columns for start of valid time and end of valid time for entities, and designing the system to be without history tables recording the history of relationships between entities in the database; the system being designed as a current view with primary key and unique key constraints, and time-related issues being taken care of by the S$, T$, and E$ tables automatically generated as the data structure of the system is populated with data.

4. A method of receiving an answer to a query in a system according to claim 1, the method comprising specifying in a query the transaction time and valid time to be used, and the processor using the valid time and prosecution time to generate from the S$, T$ and E$ tables a response to the query, and displaying the query on a screen, printing it out, or transmitting it to a remote site.

* * * * *